United States Patent [19]

Yamakawa et al.

[11] 4,383,957
[45] May 17, 1983

[54] METHOD OF SINTERING A CERAMIC COMPOSITION

[75] Inventors: Akira Yamakawa; Akira Doi; Yoshihiko Doi, all of Itami, Japan

[73] Assignee: Sumitomo Electric Industries, Ltd., Osaka, Japan

[21] Appl. No.: 265,569

[22] Filed: May 20, 1981

[30] Foreign Application Priority Data

May 29, 1980 [JP] Japan .................................. 55-70731

[51] Int. Cl.³ .............................................. C04B 35/58
[52] U.S. Cl. ..................................... 264/65; 501/103; 501/127; 501/153; 264/325
[58] Field of Search ......................... 264/65, 332, 325; 501/153, 127, 103

[56] References Cited

U.S. PATENT DOCUMENTS

| 3,455,682 | 7/1969 | Barbaras | 264/332 |
| 3,469,976 | 9/1969 | Iler | 264/332 |
| 3,562,371 | 2/1971 | Bush | 264/332 |
| 3,574,645 | 4/1971 | Anderson | 264/65 |
| 3,792,142 | 2/1974 | Kobayshi | 264/65 |
| 4,041,123 | 8/1977 | Lange | 264/332 |

FOREIGN PATENT DOCUMENTS 665373  1/1952  United Kingdom .................. 264/65

Primary Examiner—John A. Parrish
Attorney, Agent, or Firm—Wenderoth, Lind & Ponack

[57] ABSTRACT

A ceramic sintered body with a high density and high surface smoothness is obtained by sintering a ceramic composition comprising oxides as a substantial or partial component in an atmosphere of CO gas or in a mixture of CO gas and an inert gas.

5 Claims, 1 Drawing Figure

U.S. Patent   May 17, 1983   4,383,957
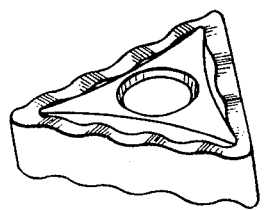

METHOD OF SINTERING A CERAMIC COMPOSITION

BACKGROUND OF THE INVENTION

1. Field of the Invention

This invention relates to a method of sintering a ceramic composition comprising oxides as at least one component.

2. Description of the Prior Art

Generally, ceramics consist of oxides only and sintering thereof is carried out in a gaseous atmosphere composed of at least one gas selected from oxygen, nitrogen, carbon dioxide, argon and helium gases at substantially normal pressure using a gas furnace. Of late, however, vacuum sintering, hot press or hot isostatic press has been employed for the purpose of obtaining fine particle and high density ceramic materials, and ceramic compositions have extended over a wide range such as including carbides in addition to oxides.

In the vacuum sintering of a ceramic composition comprising oxides substantially or as a part of the composition, a sintering furnace cannot help using carbon as a material of a heater or heat insulating felt from an economical point of view. In this case, the inside of the furnace is in a reducing atmosphere as shown by the following formulas and lower oxides with high vapor pressures are formed in a sintering at a high temperature:

$$H_2O + C \rightleftharpoons H_2 + CO \quad (1)$$

$$1/y\ A_xO_y + H_2 \rightleftharpoons (x/y)A + H_2O \quad (2)$$

$$[1/(y-z)]A_xO_y + H_2 \rightleftharpoons [1/(y-z)]A_xO_z + H_2O \quad (3)$$

In these formulas, A is a metallic atom such as Al, Zr, Si, Mg, Y, Ti, Cr, Ni and the like and x, y and z are respectively atomic ratios of a metal and oxygen, y being greater than z.

That is to say, water adsorbed in powdered materials or in the inner walls of the furnace reacts with carbon from a carbon heater, a carbon heat insulator or a combined carbon, or water reacts with the free carbon in carbides added to form carbon monoxide gas and hydrogen gas, and the oxides in a ceramic composition are reduced with this hydrogen gas to form free metals or lower oxides with high vapor pressures.

Through the above described reducing reactions, troublesome problems take place such that the carbon heater, carbon heat insulator, etc. are degraded to shorten their lives, the interior of the sintering furnace is remarkably contaminated, and lower oxides sublimate from the surface of the sintered body to degrade the surface roughness and to change the desired dimensions of the sintered body as well as to decrease the smoothness of the surface thereof. These problems can be solved to some extent by the use of a hot press, but the hot press has the disadvantage that it is very high priced and unsuitable for the production, in particular, the mass production of an article with a complicated shape.

SUMMARY OF THE INVENTION

It is an object of the present invention to provide a method of sintering a ceramic material.

It is another object of the present invention to provide a method of sintering a ceramic composition comprising at least one oxide, whereby the disadvantages of the prior art can be overcome.

It is a further object of the present invention to provide a fine particled and high density sintered body of a ceramic material.

These objects can be attained by a method of sintering a ceramic material characterized in that a ceramic composition comprising oxides as a substantial or partial component is sintered in an atmosphere of CO gas or mixed gases of CO gas and an inert gas.

BRIEF DESCRIPTION OF THE DRAWING

The accompanying drawing is a schematic view of the shape of a sintered body according to one embodiment of the present invention.

DETAILED DESCRIPTION OF THE INVENTION

The inventors have made various efforts to overcome the disadvantages of the prior art as described above and consequently, have found that the reducing reaction can be suppressed by keeping the interior of the furnace in an atmosphere equilibrated to which carbon monoxide gas is previously added totalling the foregoing formulas (1)–(3). The present invention is based on this finding. That is to say, the atmosphere in the furnace is kept in an equilibrium state as represented by the following formula:

$$(1/y)A_xO_y + [1/(y-z)]A_xO_y + 2C \rightleftharpoons (x/y)A + [1/(y-z)]A_xO_z + 2CO \quad (4)$$

Since the partial pressure of CO gas (Pco) when the reaction of the formula (4) reaches the equilibrium depends on the structure of the sintering furnace, the sintering temperature and the ceramic composition, it is necessary to choose the optimum Pco according to the sintering conditions. Thus, when the sintering temperature is between 1200° C. and 2000° C., the reaction reaches a state of equilibrium with a Pco substantially of from 5 mmHg to 760 mmHg. If the Pco is held in this range, the similar effect can be obtained even in an atmosphere consisting of a mixed gases of Co gas and an inert gas such as argon or helium.

Introduction of Co gas into a sintering furnace is preferably carried out by flowing continuously Co gas in an amount sufficient to keep the required Pco in the furnace while evacuating the furnace. In this case, the Co gas plays an additional role as a carrier gas to remove gases generated from the ceramic composition out of the furnace. Pco should be reduced to the minimum within the required range considering the sintering property and cost for the gas.

The equilibrium constant K of the formula (4) is represented by K = Pco/$a_c$ in which $a_c$ is the activity of carbon. Within a low temperature range, $a_c$ is small and the reaction of the formula (4) takes place hardly, even in a vacuum of approximately $10^{-3}$ mmHg. Thus, sintering is preferably carried out by heating a ceramic material at a temperature of from room temperature to a temperature which is as high as possible within such a range that the reaction of the formula (4) hardly occurs, preferably, where sintering of the compact starts, in a vacuum of about $10^{-3}$ mmHg, thereby removing forcedly adsorbed water, cracked gases of organic substances and other adsorbed gases from the ceramic material. Thereafter, the inside of the furnace is rinsed with CO gas and sintering is carried out while maintaining the required Pco.

The present invention is particularly useful for sintering a ceramic composition composed of predominant phases of aluminum oxide and a B1 type solid solutions of the Group IVa, Va and VIa elements of Periodic Table. The thus-produced composition is used for cutting tools or wear resisting parts, and according to the present invention, there can be obtained a ceramic tool with a smooth and sintered surface, which can be used as it is sintered. The chemical composition of a B1 type solid solution is represented by $M(C_l N_m O_n)$ in which M is a metal of Group IVa, Va or VIa; C,N and O are respectively carbon, nitrogen and oxygen and 1, m and n are molar ratios thereof with relationship of $1+m+n=1$, typical of which are $Ti(C_l N_m O_n)$ wherein $0.05 \leq n \leq 0.9$, TiC, WC, etc.

In the present invention, furthermore, a method of effecting a hot isostatic press can be employed in order to obtain a sintered body made of fine particles and having a high density after a gas non-permeable sintered body having a relative density of 95% or more is obtained by sintering in an atmosphere consisting of CO gas or a mixed gases of CO gas and an inert gas. For example, this method is carried out at a temperature of 1200° C. to 1600° C. under an inert gas pressure of 200 atm or more.

The following examples are given in order to illustrate the present invention in more detail without limiting the same.

EXAMPLE 1

When alpha-alumina ($\alpha$-$Al_2O_3$) with a purity of 99.9% and a mean particle diameter of 0.6 micron was mixed with 0.2% by weight of magnesium oxide ($M_gO$), mixed further with camphor as a binder, pressed under a pressure of 1000 Kg/cm$^2$, charged in an alumina case so as to prevent it from contamination with carbon and then subjected to sintering at 1450° C. for 2 hours in a vacuum sintering furnace, a large amount of aluminum carbide adhered to the carbon felt for insulation and the inner wall of the furnace; pinholes are formed in the carbon heater, carbon table, etc., and the alumina case was worn to a great extent. On the other hand, a similar sample was once heated at 1000° C. in a vacuum of $10^{-3}$ mmHg in a vacuum sintering furnace, the inside of the furnace was replaced by CO gas and the sample was then sintered at 1450° C. for 2 hours while introducing CO gas at a flow rate of 0.5 NL/min and adjusting the exhaust quantity of a vacuum pump so as to give Pco=30 mmHg. In this case, there were found no contamination of the interior of the furnace, nor damages or wear of the carbon heater, carbon table and alumina case.

In both the cases, there was no significant difference between the properties of the sintered bodies. That is, the above described two sintering methods both give products with similar properties, i.e. a relative density of 98.0%, mean particle diameter of 1.8 microns and hardness (HRA) of 94.0, from which it is apparent that CO gas does not hinder the sintering.

EXAMPLE 2

8% by weight of zirconium oxide ($ZrO_2$) with a mean particle diameter of 0.4 micron, 5% by weight of titanium carbide (TiC) with a mean particle diameter of 1.5 microns, 0.2% by weight of MgO and the balance of $Al_2O_3$ were mixed, further mixed with paraffin as a binder, pressed under a pressure of 1000 Kg/cm$^2$ so as to give a dimension after sintered of 13.1 mm $\times$ 13.1 mm $\times$ 5.2 mm and then subjected to sintering under various conditions in a vacuum sintering furnace, thus obtaining results shown in Table 1. From these results, it will clearly be understood that selection of a suitable Pco results in marked effects.

As to other various compositions, similar results were obtained.

TABLE 1

| | No. | Temperature Condition | Gas Condition | State of Sample | Relative Density |
|---|---|---|---|---|---|
| Vacuum Sintering | 1 | 1500° C. × 1hr | Vacuum ($10^{-3}$ mmHg) | Surface pinholes Surface $Al_2O_3$ sublimates | 95.5% |
| | 2 | 1400° C. × 1hr | Vaccum ($10^{-3}$ mmHg) | Surface pinholes Surface $Al_2O_3$ sublimates | Water absorption |
| $N_2$ gas Sintering | 3 | 1500° C. × 1hr | Vacuum ($10^{-3}$ mmHg) upto 1000° C., then $N_2$ gas 30 mmHg | Nitriding of TiC | 94% |
| Unsuitable CO gas Conditions | 4 | 1500° C. × 1hr | CO gas 0.1 mmHg | Surface $Al_2O_3$ sublimates | 96% |
| | 5 | 1600° C. × 1hr | Vacuum ($10^{-3}$ mmHg) upto then CO gas 1 mmHg | Surface $Al_2O_3$ sublimates | 97% |
| Sintering Method of Our Invention | 6 | 1500° C. × 1hr | CO gas 10 mmHg | Whole Surface Pretty | 96% |
| | 7 | 1600° C. × 1hr | CO gas 50 mmHg | Whole Surface Pretty | 97% |
| | 8 | 1500° C. × 1hr | Vacuum ($10^{-3}$ upto 1000° C., then CO gas 10 mmHg | Whole Surface Pretty | 96% |
| | 9 | 1400° C. × 1hr | Vacuum ($10^{-3}$ upto 1000° C., then CO gas 10 mmHg | Whole Surface Pretty | Water absorption |

After the sublimation of $Al_2O_3$ from the surface of the sample, TiC remained mainly.

EXAMPLE 3

When the sintered bodies obtained in Table 1, Nos. 1 and 6 were further subjected to a hot isostatic press for 1 hour under conditions of 1400° C. and 1500 Kg/cm$^2$, there were obtained fine particled and high density ceramic sintered bodies each having a relative density of 99.5% and being free from change of the surface state. The whole surface of the each sintered body was ground by means of a diamond wheel to form an insert of CIS.SNG 432 type (12.7 mm square×4.8 mm thickness), fitted to a throw-away toolholder and then subjected to a cutting test under the following cutting conditions:

workpiece: SCM 3 (steel containing 0.33–0.38% C, 0.60–0.85% Mn, 0.90–1.2% Cr, 0.25% Ni, 0.15–0.30% Mo)
cutting speed: 300 m/min
depth of cut: 1.0 mm
feed: 0.5 mm/rev
holder: FN 11 R-44
insert form: SNG 432

There was found no difference in cutting property due to the difference of the sintering method. The results of the cutting test are shown in Table 2:

TABLE 2

| Sintering Method | Polished Part | Flank Wear Width after cutting for 20 minutes |
|---|---|---|
| 1. Vacuum Sintering | whole surface | 0.25 mm |
| | depth of crater wear only | cutting impossible due to falling-off of cutting edge |
| 6. Sintering Method of Our Invention | whole surface | 0.24 mm |
| | depth of crater wear only | 0.24 mm |

EXAMPLE 4

The crater wear depths of the sintered bodies obtained in Example 3 were subjected to grinding using a diamond wheel in a thickness of 4.8 mm and to the cutting test with holding the side surfaces as they were in an analogous manner to Example 3. The resulting insert from the sintered body obtained in Table 1, No. 1 was scarcely resistant to cutting, but on the contrary, the resulting insert from the sintered body obtained in Table 1, No. 6 according to the present invention showed the similar cutting performances to the insert subjected to whole surface grinding in Example 3.

It is apparent from these results that the sintered body obtained by the sintering method of the present invention has a similar performance, independent of whether grinding is carried out or not, while the sintered body obtained by the prior art vacuum sintering method cannot exhibit the intrinsic performance under a sintered state because Al$_2$O$_3$ sublimates from the surface thereof.

The results of the cutting test are shown in Table 2.

EXAMPLE 5

When the ceramic composition of Example 2 was pressed, throw-away inserts having an insert breaker of the known shape as shown in the accompanying drawing were prepared using the sintered bodies obtained by sintering under the conditions 1 and 6 shown in Table 1. When the sintering was carried out under the condition 1, the resulting insert failed to function as the insert breaker in a cutting test because the projected shape was changed due to sublimation of Al$_2$O$_3$. On the other hand, when the sintering was carried out under the condition 6, the insert had a projected shape as designed and functioned effectively as the insert breaker.

That is to say, according to the present invention, it is possible to obtain a throw-away insert that the prior art vacuum sintering method cannot obtain. A projection or groove formed at the stage of pressing functions as an insert breaker in the sintered body.

As is evident from the foregoing description, the sintering method of the present invention is very useful for sintering a ceramic composition consisting of or comprising oxides, whereby the cost of sintering can be reduced and the mass production of ceramic composition or articles with a complicated shape or with a high dimensional precision is made possible. Thus, the use of ceramic compositions can be expanded according to the present invention.

What is claimed is:

1. A method of sintering a ceramic material which comprises sintering at a temperature of 1200° to 2000° C., a ceramic composition comprising oxides selected from the group consisting of Al$_2$O$_3$, ZrO$_2$ and mixtures thereof as a substantial or partial component in an atmosphere of CO gas or mixed gases of CO gas and an inert gas, wherein the partial pressure of the CO gas ranges from 5 mm Hg to 760 mm Hg.

2. The method of claim 1, wherein the inert gas is selected from the group consisting of argon, helium and nitrogen.

3. The method of claim 1, wherein the ceramic composition comprising oxides as a partial component is composed of predominant phases of aluminum oxide and a B1 type solid solution represented by M(C$_1$N$_m$O$_n$) in which M is a metal of Group IVa, Va or VIa and 1, m and n are molar ratios of carbon, nitrogen and oxygen with the relationship of $1+m+n=1$.

4. The method of claim 1, wherein the sintering is carried out after removing adsorbed gases from the ceramic composition.

5. A method according to claim 1 in which a gas non-permeable sintered body is produced from said sintering method in which the said sintered body has a relative density of at least 95% and said sintered body is subjected to a hot isostatic press.

* * * * *